Oct. 15, 1968   R. E. ANDERSON   3,406,113
DESALINATION PROCESS
Filed Dec. 26, 1967   2 Sheets-Sheet 1

INVENTOR.
Robert E. Anderson
BY
Griswold & Burdick
ATTORNEYS

3,406,113
DESALINATION PROCESS
Robert E. Anderson, Midland, Mich., assignor to The
  Dow Chemical Company, Midland, Mich., a corporation of Delaware
  Filed Dec. 26, 1967, Ser. No. 693,325
  12 Claims. (Cl. 210—30)

ABSTRACT OF THE DISCLOSURE

An ion exchange process is provided for the desalination of water. The process includes regeneration of the cation exchange resin with a complex sulfonic acid and regeneration of the anion exchange resin with sodium sulfite. Preferably, the regenerant effluents of both ion exchange resins are mixed and this mixture is distilled to substantially recover the complex sulfonic acid and sodium sulfite regenerants for reuse.

---

Background

Figure 1:
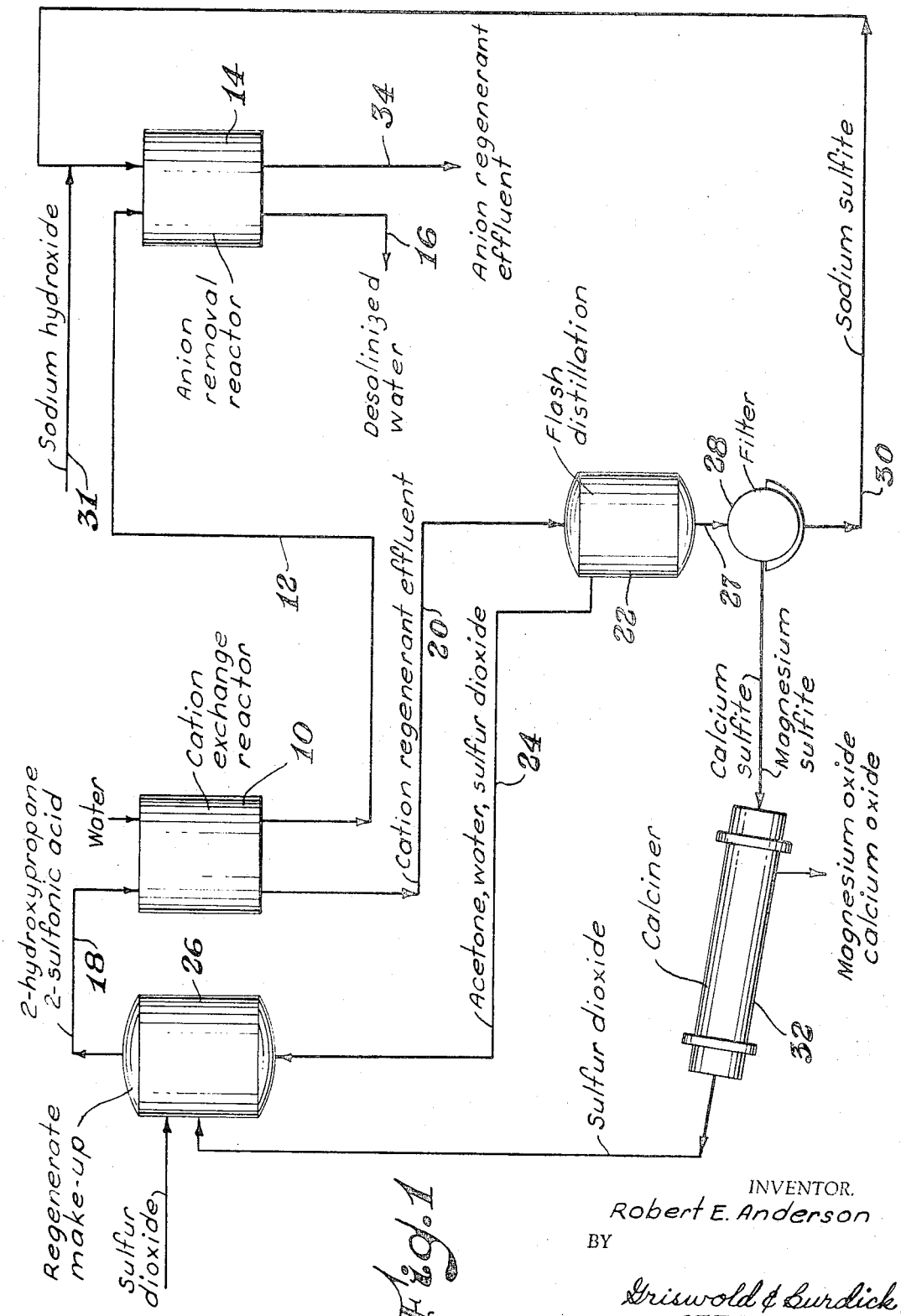

This invention relates to a process for the desalination of water. More particularly, it relates to the desalination of water by an ion exchange process which includes regeneration of the ion exchange materials, and recovery and recycle of the regenerants used in the regeneration process.

Many methods have been proposed in the past for demineralizing water, including thermal distillation, freezing, dialysis, ion exchange techniques, and the like.

In conventional demineralization processes utilizing ion exchange techniques, a cation exchange resin is used to remove metal cations, primarily sodium, magnesium, and calcium, from the water; and an anion exchange resin is used to remove anions, primarily sulfate, chloride, and carbonate from the water. The result of this dual resin treatment is the essential replacement of the cations in the water with hydrogen ions provided by the cation exchange resin. These added hydrogen ions convert the anions in the water into acids and the removal of these acids is then achieved with an anion exchange resin.

Conventional ion exchange systems are largely discontinuous and the high chemical costs of regenerating the resins, together with the problem of disposing of voluminous amounts of wastes produced in such regeneration, have made ion exchange processes uneconomical, except in the demineralization of water with a relatively low solids content. Thus, such processes have not heretofore been used in desalination where the water being treated often contains $10^2$–$10^4$ times the amount of dissolved solids that can be economically treated in conventional ion exchange demineralization processes.

It is therefore a primary object of this invention to provide a new and improved process for the desalination of water that can effectively remove the large amounts of dissolved salt from the water to economically produce a potable water product.

Another object of this invention is to provide an ion exchange process for the desalination of water in which the effluent from regeneration of the cation exchange resin can be used to regenerate the anion exchange resin.

Still another object of this invention is to provide an ion exchange process for the desalination of water using a cation exchange resin and an anion exchange resin in which the regenerant for the cation exchange resin is recovered from the cation regenerant effluent, and the remainder of the cation effluent is used to regenerate the anion exchange resin.

Yet another object of this invention is to provide an ion exchange process for the desalination of water in which the regenerants for the cation and anion exchange materials are recovered and used to minimize regenerant waste and substantially reduce the cost of replenishing regenerant chemicals.

A further object of this invention is to provide an ion exchange, desalination process in which a complex sulfonic acid is used as the regenerant for the cation exchange material.

Yet a further object of this invention is to provide an ion exchange, desalination process in which a complex sulfonic acid is used as the regenerant for the cation exchange material and in which sodium sulfite, produced in the regeneration of the cation exchange material is used as the regenerant for the anion exchange material.

Still a further object of this invention is to provide a continuous process for the desalination of water that can be carried out in a simple, effective, and economical manner.

Additional objects and advantages will be set forth in part in the description which follows, and in part will be obvious from the description or may be learned by practice of the invention, the objects and advantages being realized and attained by means of the methods, improvements, and combinations of steps particularly pointed out in the appended claims.

Statement of the invention

To achieve the foregoing objects and in accordance with its purpose, this invention, as embodied and broadly described, provides a process for the desalination of water containing dissolved, inorganic salts of (a) bivalent cations, (b) monovalent cations, including sodium, and (c) anions, which comprises: (A) bringing the salt-containing water into contact with a cation exchange resin in hydrogen form to remove the cations of the salts and produce a first effluent containing acids of the anions; (B) regenerating the cation exchange resin by contacting it with a complex sulfonic acid comprising the reaction product of sulfur dioxide, water, and a water-soluble aldehyde or ketone thereby removing the cations from the resin restoring the resin to hydrogen form, and producing a second effluent containing organic sulfonates of the cations; (C) contacting the first acid-containing effluent from the cation exchange resin with a weak base anion exchange resin to remove the acid anions and produce an effluent from the anion removal material which comprises substantially desalinized water; (D) heating the second effluent from the cation exchange resin, containing the organic sulfonates, to recover the aldehyde or ketone, a portion of the sulfur dioxide, and a solution containing sodium sulfite; (E) recycling the recovered aldehyde or ketone and sulfur dioxide to at least partially regenerate the cation exchange resin, and (F) contacting and at least partially regenerating the anion exchange resin with the sodium sulfite solution.

In accordance with a preferred embodiment of this invention in which the bivalent cations in the water include calcium and the anions include sulfate, the second effluent from the cation exchange resin is mixed with an effluent produced by regeneration of the anion exchange resin with sodium sulfite. This mixing of the effluents produces insoluble calcium sulfate, which can be easily removed from the mixture, and the combined effluents are then heated to substantially recover the aldehyde or ketone and sulfur dioxide and provide a sodium sulfite solution suitable for regeneration of the anion exchange resin. Furthermore a continuous flow of cation exchange resin countercurrent to the feed and regenerant streams is preferred. Also water-soluble $C_1$–$C_8$ aldehydes and ketones are particularly suitable for use in the regenerant solution.

Description

The accompanying drawings, which are incorporated in and constitute a part of this specification, illustrate the presently preferred embodiments of the invention and, together with the description, serve to explain the principles of this invention.

Figure 2:
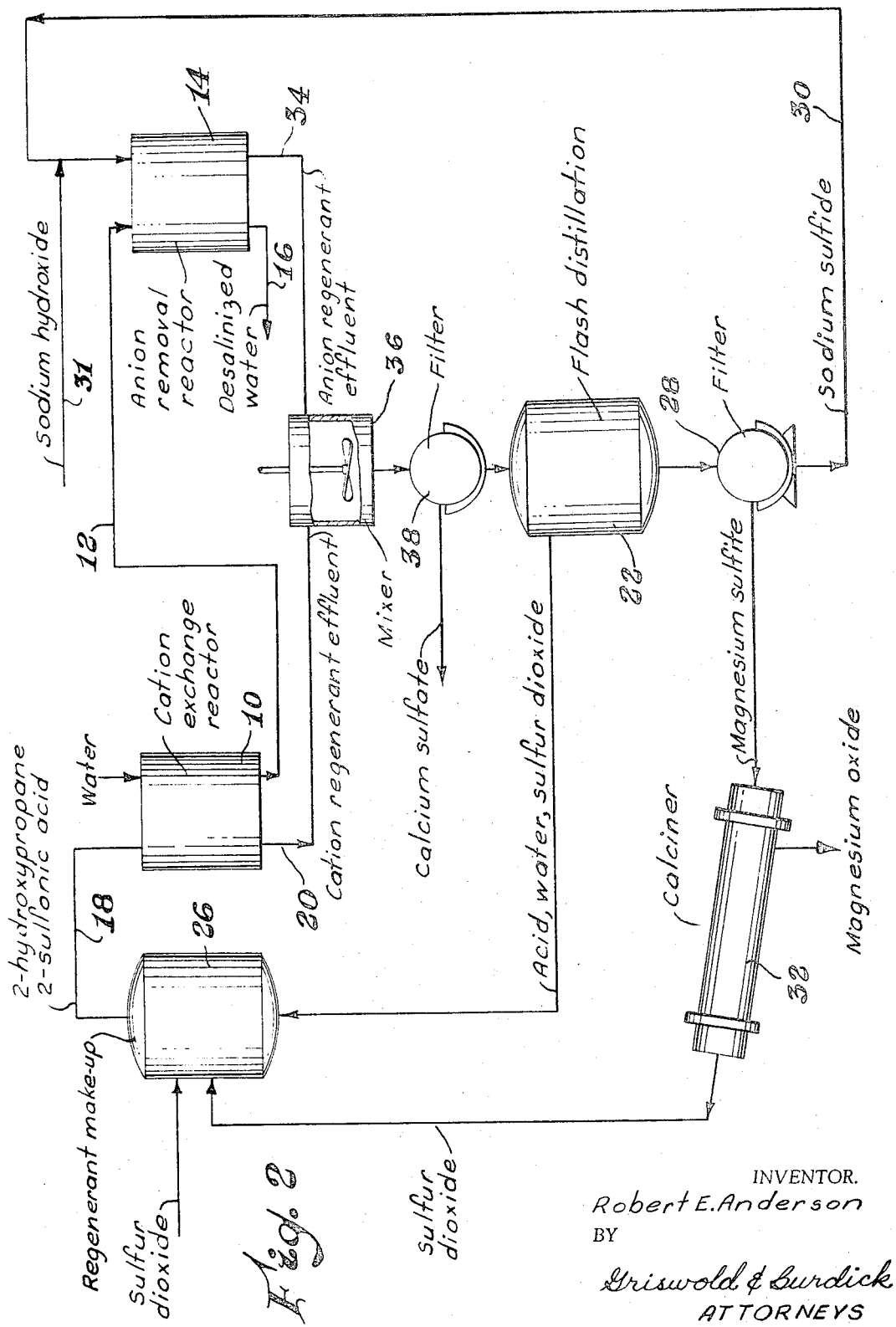

Of the drawings:

FIG. 1 is a schematic diagram of the ion exchange process of this invention showing the recovery of the cation exchange resin regenerant from the cation regenerant effluent, the recycling of the cation exchange regenerant to the cation exchange resin, and the regeneration of the anion exchange resin with the remainder of the cation regenerant effluent; and FIG. 2 is a schematic diagram of an alternative embodiment of the ion exchange process of this invention showing recovery and recycling of the regenerants for both the cation exchange resin and the anion exchange resin.

It is to be understood that both the foregoing general description and the following detailed description are exemplary and explanatory but are not restrictive of this invention.

Reference will now be made in detail to the present preferred embodiments of the invention, examples of which are illustrated in the accompanying drawings.

The ion exchange systems of this invention, like other ion exchange systems known in the art, are equilibrium systems both in the ion exchange phase of the process and in the regeneration phase. The invention utilizes ion exchange resins that are brought into contact with the water to be desalinized. These resins may be used in either the form of a fixed bed through which the water and then the regenerant are passed; or in the form of a moving bed, in which the resin is brought into contact with the water in an ion exchange vessel, and then discharged to a regeneration vessel and subsequently recycled to the ion exchange vessel. Indeed a countercurrent, continuous ion exchange reactor of the type described by Higgins, U.S. Patent 2,815,322 is particularly suitable for use in the process of this invention.

While the process of this invention will be described as it relates to a single fixed bed of resin, it is to be understood that the process is equally applicable to a moving bed method and to tandem fixed bed methods where one bed is removing ions while the other is regenerating.

As shown in FIG. 1, the water to be treated by the process of this invention is initially contacted with a cation exchange material in cation-exchange reactor 10. The most predominant cations in water are sodium, calcium, and magnesium ions and the most predominant anions are chloride, sulfate, and carbonate ions. Generally, it is desired to remove sufficient amounts of these ions from the water to produce a potable water product containing less than 500 p.p.m. of dissolved salts.

Cation-exchange reactor 10 contains a cation exchange resin in the hydrogen form. The hydrogen ions from this resin are exchanged with the metal cations in the water in reactor 10. The cation exchange resins which can be used in the process of this invention include sulfonic acid resins such as the sulfonated styrene-divinylbenzene copolymer resins commercially available under the trade names "Dowex 50W–X8" from The Dow Chemical Company, "Amberlite IR–120" from Rohm and Haas Co., "Ionac C–240" from the Ionac Chemical Co., and the like. A preferred cation exchange resin for use in the process of this invention is Dowex 50–X8 resin.

The water to be treated is passed through the cation exchange resin where the hydrogen ions in the resin are exchanged for the metal cations of the dissolved salts in the water. The reactions which occur in the cation exchange resin can be exemplified by the following equation in which $RSO_3H$ represents a sulfonic acid cation exchange resin:

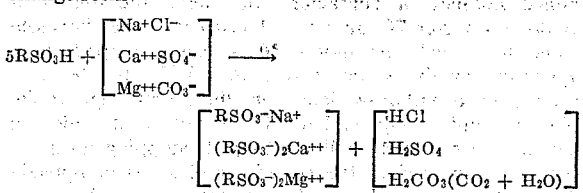

The cations of the inorganic salts in the water are thus adsorbed by the resin and the anions converted to their respective acids, producing an effluent stream 12 from reactor 10 which contains hydrochloric, sulfuric, and carbonic acid. The carbonic acid which is formed may decompose totally or in part into water and carbon dioxide gas.

In accordance with this invention, effluent 12 from cation exchange reactor 10, which contains acids of the inorganic salts, is passed through an anion exchange reactor 14 to remove these acids and produce a desalinized water product.

Anion exchange reactor 14 preferably contains a weak-base anion exchange resin that adsorbs the inorganic acid anions by forming acid salts of the resin. Resins of this type, which are water-insoluble crosslinked polymers containing primary, secondary and tertiary amino groups, are commercially available under the trade names "Dowex 44" (The Dow Chemical Company), "Duolite A30B" (Chemical Process Co.), and "Amberlite IR–45" (Rohm & Haas) resins. A preferred anion exchange resin for use in the process of this invention is Dowex 44 resin.

The reaction which occurs in anion exchange reactor 14 can be exemplified by the following equation in which $R_3N$ represents the anion exchange resin:

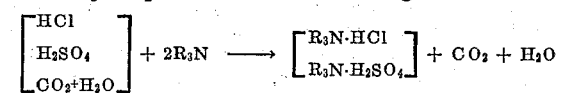

In this reaction, the chloride and sulfate anions in effluent 12 from cation exchange reactor 10 are adsorbed by the anion exchange resin, producing a water product 16 from which the dissolved inorganic salts have been substantially removed. Any remaining carbonic acid in the solution can be removed by aeration.

In accordance with this invention, the spent or partially spent cation exchange resin containing the metal cations of the inorganic salts is regenerated by contacting it with a complex sulfonic acid solution such as described by Wilson, U.S. Patent 3,248,278. The complex sulfonic acid is prepared by adsorbing sulfur dioxide in an aqueous solution of a suitable water-soluble aldehyde or ketone to produce a strong complex sulfonic acid by the reaction:

$$H_2O + R\overset{O}{\overset{\|}{C}}R' + SO_2 \rightleftarrows \underset{R'}{\overset{R}{>}}C\underset{SO_3H}{\overset{OH}{<}}$$

where

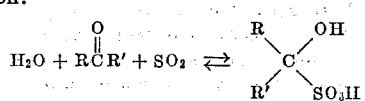

is the aldehyde or ketone. The complex sulfonic acid ($ZSO_3H$) is a highly effective cation exchange resin regenerant in the present system.

Exemplary of carbonyl compounds suitable for use in the preparation of the complex sulfonic acid are water-soluble $C_1$–$C_8$ aldehydes or ketones, such as acetone, methyl ethyl ketone, acetaldehyde, furfuraldehyde, isobutyraldehyde, cyclohexanone, formaldehyde, benzaldehyde, methyl isobutyl ketone, mesityl oxide, and salicylaldehyde. Acetone is preferred for use in the process of this invention and reacts with sulfur dioxide and water to produce 2-hydroxypropane-2-sulfonic acid.

At room temperature maximum ionization of the complex sulfonic acid can be most economically achieved at a weight ratio of water to acetone of about 7 to 1. Increasing the proportion of acetone to water above about 7 to 1 only insignificantly increases the solubility of sulfur dioxide in the mixture. An optimum acid composition is achieved using a minimum effective amount of acetone, because acetone is the most expensive reagent in the system and because large amounts of water in the solution produce maximum ionization of the acid. At a weight ratio of seven parts water to one part acetone, the complex sulfonic acid solution contains approximately 11% acetone, 12% sulfur dioxide and 77% water and has a normality roughly equivalent to a 2 N acid.

The complex sulfonic acid stream 18 containing H+ cations and $ZSO_3^-$ anions is passed through the spent cation exchange resin in reactor 10 to remove the metal cations from the resin. In this regeneration, the hydrogen ions of the sulfonic acid are exchanged for the metal cations adsorbed by the cation exchange resin and this regeneration reaction can be exemplified by the following equation:

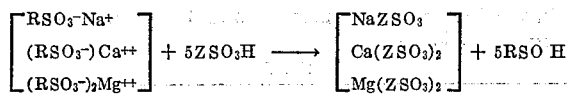

The metal cations are thus removed from the resin as organic sulfonates and the resin is returned to the hydrogen form for further desalination. The metallo-organic sulfonates formed in the cation regeneration reaction are relatively water-soluble, and the regenerant effluent stream 20 from cation-exchange reactor 10 thus contains sodium, calcium, and magnesium sulfonates.

In accordance with this invention, regenerant effluent stream 20 is treated to recover the carbonyl compound and a portion of the sulfur dioxide for further use in regenerating the cation exchange resin. This recovery procedure can be carried out by flash distillation at about 100° C. in a suitable vessel 22 in which the carbonyl compound, a portion of the sulfur dioxide, and some water are stripped from the effluent as distillate stream 24. Since all of this distillate is to be later recombined to again form the complex sulfonic acid, it is immediately passed to regenerant make-up vessel 26 without separating each of its various components.

Distillation of the cation regenerant effluent 20 is exemplified by the following equation:

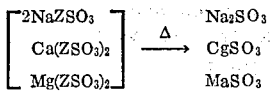

where R' is the aldehyde or ketone originally used to produce the complex sulfonic acid regenerant.

The residue 27 exiting distillation vessel 22 contains water, and sodium, calcium and magnesium sulfites. The sulfites of calcium and magnesium are insoluble in water and precipitate out of residue 27. These insoluble sulfites are removed by filter 28, leaving a final stream 30 comprising an aqueous sodium sulfite solution.

Only about one-half of the sulfur dioxide in the sulfonic acid regenerant is recovered by the distillation in vessel 22, with the remainder forming sulfites of the metal cations in the cation regenerant effluent. Thus, additional sulfur dioxide must usually be added to make-up tank 26 to provide the sulfonic acid concentration necessary to achieve subsequent regeneration of the cation exchange resin.

The insoluble sulfite salts of calcium and magnesium removed from the cation regenerant effluent in filter 28 are a source of additional sulfur dioxide, and can be used to prepare the complex sulfonic acid regenerant. In accordance with one embodiment of this invention, therefore, these salts are calcined in calciner 32 by heating them, in the case of magnesium sulfite to around 600° C., and in the case of calcium sulfite to around 1200° C. This calcining decomposes the sulfite salts into their respective oxides and sulfur dioxide. The additional quantities of sulfur dioxide recovered by calcining substantially reduce the amount of sulfur dioxide from an external source that must be added to make-up tank 26, thereby further economizing the process of this invention.

The aqueous sodium sulfite solution 30, resulting from distillation and filtration of cation regenerant effluent 20, is used as the regenerant for the anion exchange resin in reactor 14. The amount of sodium ions in solution 30 necessary to regenerate the anion exchange resin is dependent upon the relative amounts of sodium and alkaline earth ions in the water treated by the process of this invention. Additional quantities of alkaline material, such as sodium hydroxide, therefore, may need to be added to the sodium sulfite solution to make up the amount of base material needed to regenerate the resin. The use of the sodium sulfite from treated cation effluent 20, however, reduces, at least in part and perhaps in whole, the quantities of alkaline material that must be added from an external source to effect regeneration of the anion exchange resin. Regeneration of the anion exchange resin can be exemplified as follows:

and

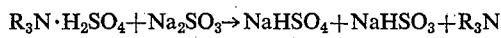

The presence of sodium hydroxide in the anion exchange resin regenerant reduces the amount of sodium bisulfite produced in the regeneration by reacting with a portion of the hydrogen ions of the acids to form water. This reaction can be exemplified as follows:

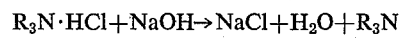

and

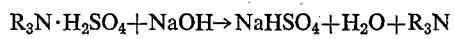

Anion regenerant effluent 34 is generally discarded as regenerant waste. However, additional quantities of sulfur dioxide for use in regeneration of the cation exchange resin can be recovered if desired by heating the sodium bisulfate-bisulfite mixture.

In accordance with an alternative and preferred embodiment of this invention, anion regenerant effluent 34 is more efficiently used as a source of additional sodium sulfite for regeneration of the anion removal resin, and as a source of sulfate ions to be used in the removal of calcium ions from cation regenerant effluent 20.

In this preferred embodiment of the invention illustrated in FIG. 2, anion regenerant effluent 34 is mixed with cation regenerant effluent 20 in mixer tank 36 prior to distillation of the combined effluents to recover sulfur dioxide and the carbonyl compound. By mixing the two regenerant effluents, insoluble calcium sulfate is precipitated.

After removing the calcium sulfate from the combined effluents in filter 38, the effluent mixture is flash distilled in vessel 22 to recover the carbonyl compound and a major portion of the sulfur dioxide as distillate 24. Distillation of the combined effluents leaves a liquid residue containing magnesium sulfite, sodium sulfite, and the inert salts sodium sulfate and sodium chloride.

Insoluble magnesium sulfite is formed during the distillation by the decomposition of magnesium sulfonate. This magnesium sulfite is removed from the effluent in filter 28, and calcined in calciner 32 to recover additional quantities of sulfur dioxide for use in cation regenerant solution 18. The removal of magnesium sulfite leaves a final stream 30 comprising substantially an aqueous solution of the sodium sulfite originally used to regenerate the anion removal resin, along with inert sodium sulfate and sodium chloride.

Solution 30 is then recycled to reactor 14 as the regenerant for the anion exchange resin, with additional quantities of sodium hydroxide being added at 31, if needed, to provide the required sodium ion concentration. While the inert sodium salts do not adversely effect regeneration of the anion exchange resin, they preferably should be continuously bled from the system to prevent them from building up and mechanically affecting the operation of the process of this invention.

By combining anion and cation regenerant effluents 20 and 34 in the manner described above, rather than merely disposing of the anion regenerant effluent, substantially increased quantities of sulfur dioxide can be recovered during distillation because the sulfur dioxide is no longer needed to form the sulfite salts of calcium. This represents a more economical procedure for the recovery of sulfur dioxide because calcium sulfite must be heated to about 1200° C. to recover its sulfur dioxide content, whereas distillation recovery of sulfur dioxide in accordance with the preferred form of this invention can be accomplished at temperatures of about 100° C. or less. The preferred embodiment of this invention, therefore, provides a more economical process for the recovery of sulfur dioxide. Further, by calcining the magnesium sulfite above, as shown in FIG. 2, substantially all of the original sulfur dioxide content in the regenerant can be recovered.

By combining the regenerant effluents, it is also possible to economically recover sodium sulfite from the anion regenerant effluent for reuse in the regeneration of the anion exchange resin. During regeneration of the anion exchange resin with sodium sulfite, sodium bisulfite is formed due to the presence of the hydrogen ions in the acids adsorbed by the resins. By mixing the effluents in mixer tank 36, this bisulfite compound is converted back to sodium sulfite, generally in an amount equivalent to that initially used to regenerate the anion exchange resin.

While aditional quantities of alkaline material may need to be added to the solution in some cases to provide required concentrations of sodium ions, once the process has been initiated with the required amounts of sodium sulfite, the need for addition of sodium hydroxide at 31 will be minimized if not eliminated altogether.

The reactions believed to occur between the mixed regenerant effluents in tank 36 can be summarized as follows:

Anion Regenerant    Cation Regenerant $NaHSO_3 + 2NaHSO_4 + Ca(ZSO_3)_2 + NaZSO_3 \longrightarrow$ Mixed Effluents $CaSO_4\downarrow + Na_2SO_4 + Na_2SO_3 + 3ZSO_3H$ The calcium sulfate is removed by filter 38, the sulfonic acid is removed in distillation tank 22, and sodium sulfite solution 30, containing inert sodium sulfate, is recycled to reactor 14 as the regenerant for the anion exchange resin.

It will therefore be apparent from the foregoing description that this invention provides simple, economical, and effective methods for the desalination of water having several important advantages not heretofore realized in prior art processes. Such advantages include substantial elimination of the problem of disposing of waste materials, by converting portions of the salts in the water into usable or easily disposable byproducts, and by utilizing other portions as regenerants for the ion removal resins.

Further, the chemical agents used in the process to regenerate the resins are substantially recovered, thus allowing the process to operate economically and continuously in the desalination of water containing a high degree of dissolved solids.

For a clearer understanding of this invention, specific examples of it are set forth below. These examples are merely illustrative and are not intended to limit the scope and underlying principles of this invention in any way.

EXAMPLE 1

Regenerant solution

This example illustrates the preparation of 2-hydroxypropane-2-sulfonic acid as a regenerant for the cation exchange resin.

The complex sulfonic acid is prepared by adsorbing sulfur dioxide gas in various mixtures of water and acetone in a gas adsorption column. The adsorption column consists of a 1-inch glass tube filled to a depth of 8 inches with berl saddles. The column is topped with a 3-bulb condenser.

Sulfur dioxide is fed into the bottom of the column through a fritted-glass sparger located just below the packing. The liquid mixture of acetone and water is then introduced above the packing by means of a pump. The liquid mixture drains down through the packing and out the bottom of the column into a 2-liter flask fitted with a reflux condenser. Condensate from the reflux condenser is recycled back through the pump and into the top of the gas adsorption column.

The adsorption column is operated for various periods of time to determine the optimum ratio of acetone to water at maximum concentrations of sulfur dioxide. The results of several runs made at room temperature are set forth below in Table I.

TABLE I

| Weight ratio of $H_2O$/acetone | Contact time (hrs.) | Normality of acid |
|---|---|---|
| 1/1 | 1 | [1] 1.8 lower phase |
| 1/1 | 1¾ | [1] 2.09; p=1.072 |
|  |  | [1] 3.43; p=0.989 |
| 2/1 | 2 | 1.95 |
| 2/1 | 3 | [2] 2.48 |
| 3/1 | 1 | 1.7 |
| 3/1 | 4 | 2.1 |
| 5/1 | 2 | 0.42 |
| 5/1 | 3 | 1.0 |
| 5/1 | 5 | 1.96 |
| 9/1 | 1 | 0.87 |
| 9/1 | 2 | 1.45 |
| 9/1 | 3 | 1.64 |
| 9/1 | 4 | 1.72 |
| 9/1 | 5 | 1.90 |

[1] Liquid separated into two phases.
[2] Supersaturated.

The solubility of sulfur dioxide reaches a maximum concentration of roughly about 2 N at 20–25° C. regardless of the weight ratio of water to acetone, although higher ratios require longer contact times to adsorb the maximum concentration of sulfur dioxide. The sulfonic acid composition preferably has a weight ratio of seven (7) parts water to one (1) part acetone. At this weight ratio, a 2 N acid solution contains approximately 11% acetone, 12% sulfur dioxide, and 77% water.

EXAMPLE 2

Desalination of brackish water

This example illustrates the desalination of water according to the preferred embodiment of this invention and the recovery and recycling of the regenerants to the cation exchange resin and the anion exchange resin.

Brackish water containing the following concentration of metal cations and anions, in milliequivalents per liter (meq./l.), is used in this example.

| Cations | | Anions | |
|---|---|---|---|
| $Ca^{++}$ | 9.50 | $Cl^-$ | 0.30 |
| $Mg^{++}$ | 6.25 | $SO_4^-$ | 15.90 |
| $Na^+$ | 4.25 | $CO_3^-$ | 3.80 |
| | 20.00 | | 20.00 |

Cation exchange

The brackish water containing 20 meq./l. of the cations recited above is passed through a cation exchange reactor containing Dowex 50W–X8 resin having an operating capacity of 1.4 meq./ml. The reactor, therefore, requires at least 14.3 ml. of resin (20 meq./l./1.4 meq./ml.) to remove the cations in each liter of water passed through it.

The metal cations in the influent brackish water are substantially adsorbed by the resin in the cation exchange reactor, by exchange with $H^+$ ions in the resin to produce the corresponding acids of the anions in the water. The effluent from the reactor has the following ion concentrations in meq./l.

| Cations | Anions |
|---|---|
| $H^+$ 16.2 | $SO_4^-$ 15.9 |
|  | $Cl^-$ 0.3 |
|  | 16.2 |

The effluent also contains 1.9 mmoles of carbon dioxide and $H_2O$, the decomposition products of the carbonic acid formed in the cation exchange reactor.

*Anion exchange*

The first effluent from the cation exchange resin containing 16.2 meq./l. of anions and 1.9 mmoles of $CO_2$ is passed through an anion exchange reactor containing Dowex 44 resin and having an operating capacity of 2 meq./ml. The reactor, therefore, requires at least 8.1 ml. of resin to remove the acids in every liter of effluent.

The anion exchange reactor produces a first effluent containing only water and $CO_2$, the acids of the anions having been adsorbed by the resin.

*Regeneration of cation exchange resin*

The spent cation exchange resin is regenerated with the 2 N (2 meq./ml.) 2-hydroxypropane-2-sulfonic acid prepared in Example 1. Since the resin contains 20 meq./l. of cations, 10 ml. (20 meq./l./2 meq./ml.) of the sulfonic acid is required to remove the cations in every liter of water which has been passed through the resin. A total of 14.3 ml. of the sulfonic acid (28.6 meq.) per liter of water previously treated are used to insure regeneration of the resin to a suitable operational level.

The regenerant effluent contains the following concentrations of ions in meq. per liter of water treated, 20 meq. of $H^+$ ions (per liter of water initially passed through the resin) having been adsorbed by the resin and exchanged for the cations. Z represents the radical 2-hydroxypropane in the sulfonic acid anion.

| Cations | Anions |
|---|---|
| $Ca^{++}$ 9.50 | $ZSO_3^-$ 28.60 |
| $Mg^{++}$ 6.25 |  |
| $Na^+$ 6.25 |  |
| $H^+$ 8.60 |  |
| 28.60 |  |

*Regeneration of the anion exchange resin*

The spent anion exchange resin is regenerated with sodium sulfite. Since the resin now contains 16.2 meq. of anions for each liter of water previously passed through the resin, a solution of 18.3 meq. of $Na^+$, 15.75 meq. of $SO_3^=$, and 2.55 meq. of $OH^-$ anions (per liter of water previously passed through the resin) is used to insure substantial regeneration of the resin.

The regenerant effluent contains the following concentrations in meq. per liter of water treated.

| Cations | Anions |
|---|---|
| $Na^+$ 18.3 | $Cl^-$ 0.3 |
|  | $HSO_3^-$ 7.9 |
|  | $HSO_4^-$ 5.9 |
|  | $SO_4^-$ 4.2 |
|  | 18.3 |

*Recovery of regenerants from regenerant effluents*

The regenerant effluent from the cation exchange reactor is mixed with the regenerant effluent from the anion exchange reactor to produce a solution of mixed effluents containing the following ion concentrations, in meq. per liter of water treated.

| Cations | Anions |
|---|---|
| $Ca^{++}$ 9.50 | $Cl^-$ 0.3 |
| $Mg^{++}$ 6.25 | $HSO_3^-$ 7.9 |
| $Na^+$ 22.55 | $HSO_4^-$ 8.0 |
| $H^+$ 8.60 | $ZSO_3^-$ 28.6 |

Mixing the effluent from the cation exchange resin, containing metal sulfonates, with the effluent from the anion removal resin, containing bisulfates and bisulfites precipitates about 0.646 (9.5 mmole)/l. of calcium sulfate. After removing the $CaSO_4$ by filtration, the remaining solution is flash distilled to recover substantially all the acetone, 25.4 mmoles of sulfur dioxide, and some $H_2O$. Removal of $SO_2$ from the mixture during distillation produces a precipitant of .325 gm./l. of magnesium sulfite (6.25 meq. of $Mg^{++}$ and 6.25 meq. of $SO_3^=$).

After filtering off the magnesium sulfite, the supernatant portion of the distillation residue, consisting predominantly of sodium sulfite and small amounts of inert sodium chloride and sodium sulfate has the following ion concentrations in meq. per liter of water treated.

| Cations |  | Anions |
|---|---|---|
| $Na^+$ 15.75 |  | $SO_3^-$ 15.75 |
| $Na^+$ 6.5 | Inert salts | $SO_4^-$ 6.5 |
| $Na^+$ 0.3 |  | $Cl^-$ 0.3 |

*Recycling of cation regenerant*

The distillate from the mixed effluents, containing acetone, sulfur dioxide, and water, is recycled as a regenerant to the cation exchange resin. The distillate contains 25.4 mmoles of $SO_2$ (per liter of water treated) that is capable of providing 25.4 meq. of sulfonic acid. Since 28.6 meq. of the sulfonic acid is required to insure regeneration of the cation exchange resin, 3.2 mmoles/l. of $SO_2$ are added to fortify the cation regenerant and provide a sulfonic acid solution having the necessary ion concentration.

*Recycling of anion regenerant*

The supernatant portion of the distillation residue, containing sodium sulfite, is recycled as the regenerant for the anion exchange resin. The supernatant contains 15.75 meq. (per liter of water treated) of sodium sulfite. Since 18.3 meq. of sodium ions are required to insure substantial regeneration of the anion exchange resin, 2.55 meq. (per liter of water treated) of sodium hydroxide are added to fortify this regenerant. The regenerant thus contains 18.3 meq. of $Na^+$, 15.75 meq. of $SO_3^=$, and 2.55 meq. of $OH^-$, plus the inert sodium chloride and sodium sulfate salts as shown above.

EXAMPLE 3

*Sulfur dioxide recovery*

The magnesium sulfite precipitate resulting from distillation of the regenerant effluent mixture in Example 2 is calcined at 600° C. to produce magnesium oxide and 3.12 mmoles of sulfur dioxide per liter of water treated.

The sulfur dioxide is then recycled to the cation regenerant. This additional source of $SO_2$, in combination with the $SO_2$ in the distillate, as shown in Example 2, substantially eliminates the need for adding $SO_2$ to the regenerant from an external source.

EXAMPLE 4

Desalination

The first part of the procedure of Example 2 is repeated in this example up to and including the step of regenerating the cation exchange resin with the sulfonic acid prepared in Example 1.

The cation regenerant effluent again contains the following concentrations of ions in meq. per liter of water treated. Z represents the 2-hydroxypropyl group of the sulfonic acid anion.

| Cations | | Anions | |
|---|---|---|---|
| $Ca^{++}$ | 9.50 | $ZSO_3^-$ | 28.60 |
| $Mg^{++}$ | 6.25 | | |
| $Na^+$ | 4.25 | | |
| $H^+$ | 8.60 | | |
| | 28.60 | | |

The regenerant effluent is flash distilled to recover substantially acetone, 18.6 mmoles of sulfur dioxide and some water. Removal of sulfur dioxide from the effluent during distillation produces a precipitate of .325 gm./l. of magnesium sulfite (6.25 meq. of $Mg^{++}$ and 6.25 meq. of $SO_3^=$) and .570 gm./l. of calcium sulfite (9.50 meq. of $Ca^{++}$ and 9.50 meq. of $SO_3^=$).

After filtering off the magnesium and calcium sulfites, the supernatant portion of the distillation residue consists predominantly of sodium sulfite (4.25 meq. of $Na^+$ and 4.25 meq. of $SO_3^=$).

Recycling of cation regenerant

The distillate containing acetone, sulfur dioxide, and water, is recycled as a regenerant to the cation exchange resin as shown in Example 2. The distillate contains 18.6 mmoles of $SO_2$ (per liter of water treated) that is capable of forming 18.6 meq. of sulfonic acid. Since 28.6 meq. per liter of water treated of the sulfonic acid is required to insure regeneration of the cation exchange resin, 10.0 mmoles/l. of $SO_2$ are added to fortify the cation regenerant and provide a sulfonic acid solution having the necessary ion concentration.

Regeneration of the anion exchange resin

The supernatant portion of the distillation residue containing sodium sulfite is used as the regenerant for the anion removal resin. The supernatant contains 4.25 meq. (per liter of water treated) of sodium sulfite. Since 18.3 meq. of sodium ions are required to insure substantial regeneration of the anion exchange resin. 14.05 meq. (per liter of water treated) of sodium hydroxide are added to fortify this regenerant. The regenerant thus contains 18.3 meq. of $Na^+$, 4.25 meq. of $SO_3^=$, and 14.05 meq. of $OH^-$.

EXAMPLE 5

Sulfur dioxide recovery

The mixture of magnesium sulfite and calcium sulfite, resulting from distillation of the cation regenerant effluent in Example 4, is calcined at first 600° C. and then at 1200° C., to produce magnesium oxide, calcium oxide, and 7.8 mmoles of sulfur dioxide per liter of water treated.

The sulfur dioxide is then recycled to the cation regenerant. This additional source of sulfur dioxide, in combination with the $SO_2$ in the distillate in Example 4, substantially reduces the amount of $SO_2$ required to be added to the regenerant from an external source.

EXAMPLE 6

Effluent treatment

To further demonstrate the advantages obtained by mixing the effluents from the anion exchange and cation exchange resins, a sample corresponding to the composition of a typical cation regenerant effluent is prepared from magnesium, calcium, and sodium hydroxides (or oxides), and the sulfonic acid produced in Example 1. The concentrations of the metal cations and sulfonic acid anions, as measured in mmoles of $SO_2$, are shown in Table II below.

A typical anion regenerant effluent composition is also prepared by dissolving calculated amounts of $Na_2SO_4$, $NaHSO_3$, $NaHSO_4$, and $NaCl$ in water. The concentrations of sodium ions and of these anions are also shown in Table II below.

The prepared regenerant effluents are then mixed, filtered to remove any precipitates, and distilled. The precipitates, distillate, and residue following distillation are analyzed.

TABLE II

| Regenerant effluent | Ions (meq.) | | | | | | | Volume (ml.) |
|---|---|---|---|---|---|---|---|---|
| | $Na^+$ | $Ca^{++}$ | $Mg^{++}$ | $H^+$ | $SO_4^-$ | $Cl^-$ | $SO_2$ (mmoles) | |
| Cation | 85 | 190 | 125 | | | | 572 | 304 |
| Anion: | | | | | | | | |
| $NaHSO_3$ | 183 | | | 183 | | | 183 | |
| $NaHSO_4$ | 159 | | | 159 | 318 | | | 172 |
| $NaCl$ | 6 | | | | | 6 | | |
| $Na_2SO_4$ | 140 | | | | 140 | | | |
| Total | 573 | 190 | 125 | 342 | 458 | 6 | 755 | 476 |

The results of this example show that approximately 75% of the calcium ions in the cation regenerant effluent precipitate out as $CaSO_4 \cdot 2H_2O$. Further, the amount of $SO_2$ left in the solids after distillation corresponds roughly to the sulfites of the $Mg^{++}$ and remaining $Ca^{++}$ ions in the residue.

This invention in its broader aspects is not limited to the specific details shown and described and departures may be made from such details within the spirit and scope of the accompanying claims without departing from the principles of the invention and without sacrificing its chief advantages.

What is claimed is:

1. A process for the desalination of water containing dissolved inorganic salts of monovalent cations, including sodium; bivalent cations; and anions; which comprises:

(A) bringing the water into contact with a cation exchange resin in hydrogen form to remove the cations of the salts and produce a first effluent from the cation exchange resin containing acids of the anions of the salts;

(B) regenerating the cation exchange resin by contacting it with a complex sulfonic acid solution comprising the reaction product of sulfur dioxide, water, and a water-soluble aldehyde or ketone to remove the cations from the cation exchange resin, restore it to the hydrogen form, and produce a second effluent containing organic sulfonates of the cations;

(C) contacting the first acid-containing effluent with a weakly basic anion exchange resin to remove the acids in the effluent and produce an effluent from the anion exchange resin containing substantially desalinized water;

(D) heating the second effluent from the cation exchange material to break down the organic sulfonates and substantially remove the aldehyde or ketone and a portion of the sulfur dioxide from the effluent, and produce a solution containing sodium sulfite;

(E) recycling the recovered aldehyde or ketone and sulfur dioxide to at least partially regenerate the cation exchange material; and (F) contacting and at least partially regenerating the anion exchange resin with the sodium sulfite solution.

2. The process of claim 1 using a water-soluble $C_1$–$C_8$ aldehyde or ketone.

3. The process of claim 1, in which insoluble sulfites of the bivalent cations are also formed during heating of the second effluent from the cation exchange material, and in which at least one of these sulfites is calcined to recover sulfur dioxide for reuse in the cation exchange regenerant solution.

4. The process of claim 3, in which the bivalent cations include calcium and magnesium.

5. A process for the desalination of water containing dissolved inorganic salts of monovalent cations, including sodium; bivalent cations, including calcium; and anions, including sulfate; which comprises:

(A) bringing the water into contact with a cation exchange resin in hydrogen form to remove the cations of the salts and produce a first effluent from the cation exchange resin containing acids of the anions of the salts;

(B) regenerating the cation exchange resin by contacting it with a complex sulfonic acid solution comprising the reaction product of sulfur dioxide, water, and a water-soluble aldehyde or ketone to remove the cations from the cation exchange resin, restore it to the hydrogen form, and produce a second effluent from the cation exchange material containing organic sulfonates of the cations;

(C) contacting the first, acid-containing effluent with a weakly basic anion exchange resin to remove the acids in the effluent and produce a first effluent from the anion exchange resin containing substantially desalinized water;

(D) regenerating the anion exchange resin by contacting it with a solution containing sodium sulfite to remove the acids from the anion exchange resin, restore the material to its basic form, and produce a second effluent from the anion exchange resin containing inorganic sodium salts of the acid anions, including sodium bisulfate and sodium bisulfite;

(E) mixing the second effluent from the cation exchange resin with the second effluent from the anion exchange resin to form sodium sulfite and a precipitate of calcium sulfate;

(F) filtering off the calcium sulfate;

(G) subsequently heating the combined effluents to remove the aldehyde or ketone and sulfur dioxide;

(H) recycling the recovered aldehyde or ketone and sulfur dioxide to at least partially regenerate the cation exchange material; and (I) recycling the sodium sulfite solution to at least partially regenerate the anion exchange resin.

6. The process of claim 5, in which the bivalent cations in the water include magnesium, with the magnesium cations forming a precipitate of magnesium sulfite during the step of heating the combined effluents, and in which the magnesium sulfite is removed from the sodium sulfite solution before it is recycled to the anion exchange resin.

7. The process of claim 6, in which the precipitated magnesium sulfite is calcined to recover sulfur dioxide which is also recycled for reuse in the regenerant solution for the cation exchange resin.

8. The process of claim 5, in which a water-soluble $C_1$–$C_8$ aldehyde or ketone is used.

9. The process of claim 8, in which ketone is acetone.

10. The process of claim 9, in which the complex sulfonic acid solution comprises, by weight, about 12% sulfur dioxide, about 11% acetone, and the balance water.

11. The process of claim 5, in which the cation exchange material is a sulfonic acid resin.

12. The process of claim 5, in which the weak base anion exchange resin is a water-insoluble crosslinked polymer containing primary, secondary, and tertiary amino groups.

References Cited

UNITED STATES PATENTS 2,815,322   12/1957   Higgins     210—33
3,248,278   4/1966   Wilson     210—38 X SAMIH N. ZAHARNA, *Primary Examiner.*